(No Model.)

E. TILMANN.
FRICTIONAL DRIVING GEAR FOR BICYCLE DYNAMOS.

No. 532,840. Patented Jan. 22, 1895.

WITNESSES:
Juan Carlos Abel
Geo. L. Wheelock

INVENTOR
Ernest Tilmann
BY
ATTORNEYS.

UNITED STATES PATENT OFFICE.

ERNEST TILMANN, OF NEW YORK, N. Y., ASSIGNOR OF ONE-HALF TO CHARLES K. LEXOW, OF SAME PLACE.

FRICTIONAL DRIVING-GEAR FOR BICYCLE-DYNAMOS.

SPECIFICATION forming part of Letters Patent No. 532,840, dated January 22, 1895.

Application filed July 21, 1894. Serial No. 518,183. (No model.)

*To all whom it may concern:*

Be it known that I, ERNEST TILMANN, a citizen of the Republic of France, residing in the city, county, and State of New York, have invented certain new and useful Improvements in Frictional Driving-Gear for Bicycle-Dynamos, of which the following is a specification.

The object of this invention is to furnish for bicycles of all kinds an improved driving-gear for rotating the armature of a small magneto or dynamo-electric machine which is mounted on the frame of the bicycle, preferably below the seat, so as to generate electric currents of sufficient intensity for lighting a small incandescent electric lamp located on the front-fork of the bicycle, said driving gear being adjustable relatively to the rim of one of the wheels, so as to be placed in frictional contact when the armature is to be rotated or removed from the same when no motion is to be transmitted to the armature.

In the bicycles heretofore in use, it has been proposed to operate a magneto or dynamo-electric machine mounted on the frame of the bicycle by means of a frictional driving-gear that is operated in contact with the solid rubber tires heretofore in use in bicycles. With the introduction of the pneumatic tire, the use of the tire for driving the small dynamo is precluded, as the continuous friction would be liable to injure the tire, and as the same, owing to its yielding nature, is not properly adapted for imparting a continuous and uniform motion.

My invention therefore consists of a driving-gear for small dynamos, mounted on bicycles, in which a friction-cone of rubber or other elastic material is placed in contact with the convex surface of the rim of one of the wheels, the shaft of said friction-cone being supported in a bracket-sleeve provided with ball-bearings, said bracket being applied by a clamping device to the fork near the rim. The clamping device can be readily operated so as to permit the adjustment of the friction-cone relatively to the rim, and thereby the starting and stopping of the cone-shaft. The shaft of the friction-cone is connected by a suitable motion transmitting mechanism with the shaft of the armature of the dynamo, as will be fully described hereinafter and finally pointed out in the claims.

Figure 1:
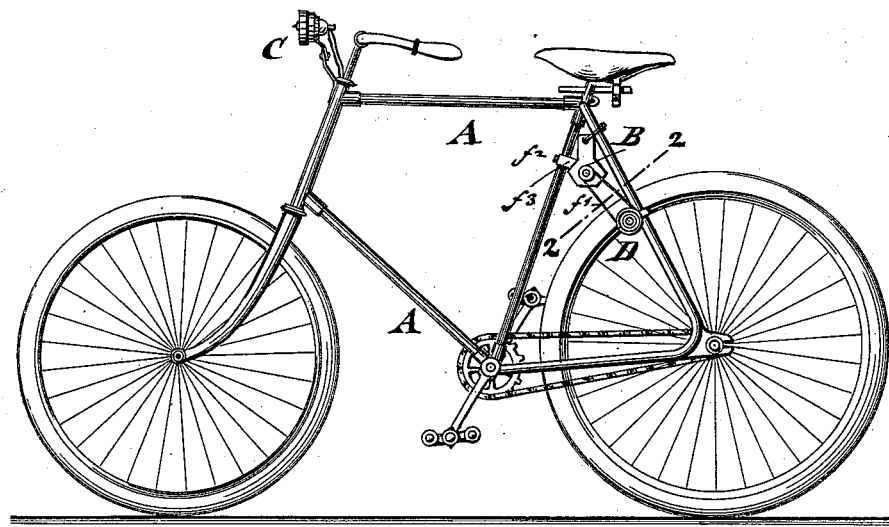
Figure 2:
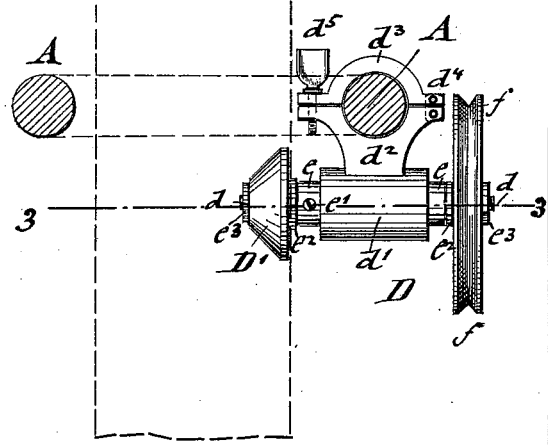
Figure 3:
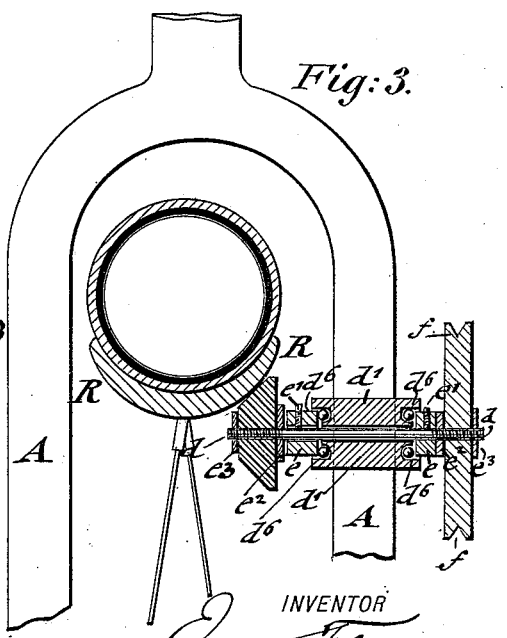

In the accompanying drawings, Figure 1 represents a side-elevation of a bicycle, on the frame of which is mounted a small dynamo, which is driven by my improved frictional driving-gear, said figure also showing the electric incandescent lamp which is lighted by the currents generated by the dynamo. Fig. 2 represents a plan-view, partly in section on line 2, 2, Fig. 1, of the driving-gear, drawn on a larger scale, and Fig. 3 is a vertical longitudinal section of the driving-gear, on line 3, 3, Fig. 2, showing the rim of the wheel and the pneumatic tire of the same in vertical transverse section.

Similar letters of reference indicate corresponding parts.

Referring to the drawings, A represents the frame of a bicycle; B, a small magneto- or dynamo-electric machine which is preferably mounted on the frame below the seat; C, an electric incandescent lamp with its reflector, which is supported on the front-fork and which is connected by suitable conducting-wires with the commutator of the dynamo, and D a frictional driving-gear, which is operated in contact with the rim of one of the wheels, and which is connected by a suitable motion-transmitting mechanism with the armature shaft of the dynamo.

The frictional driving-gear D consists of a friction-cone D' at the inner end of a shaft $d$, which turns in a sleeve $d'$ that is arranged at the end of a bracket $d^2$, which is preferably clamped by a semi-circular piece $d^3$ to one of the tines of the rear-fork of the frame A, the semi-circular piece $d^3$ being connected by a pivot-link $d^4$ with the bracket $d^2$ and retained on the tine of the fork by a thumb-screw $d^5$, which engages through a lug of the bracket $d^2$ and a lug of the semi-circular clamping-piece $d^3$, as shown clearly in Fig. 2. By loosening the thumb-screw $d^5$, the bracket $d^2$ can be readily adjusted on the fork so that the friction-cone D' can be placed either in contact with the rim R of the wheel or moved slightly away from the same, according as the armature is to be rotated or stopped. The sleeve $d'$ of the bracket $d^2$ is provided at opposite ends with grooves $d^6$ that are concentric with the shaft $d$, said grooves being provided with anti-friction balls, which are retained in position by means of collars $e$, $e$, which are secured to the shaft by means of setscrews $e'$. The shaft $d$ is extended beyond the collars $e$ $e$ and provided with a threaded inner end to which the friction-cone $D'$, which is made of elastic material is retained. A washer $e^2$ is interposed between the friction-cone $D'$ and the adjacent collar $e$, and a screw-nut $e^3$ is placed on the outer end of the threaded shaft $d$ so as to retain the friction-cone $D'$ firmly in position on the shaft. To the opposite end of the shaft is applied a pulley $f$ which is also separated from the collar adjacent thereto by a suitable washer $e^2$, and which is likewise retained on the opposite threaded end of the shaft by a nut $e^3$. A belt or cord $f'$ transmits motion from the pulley $f$ to a pulley on the shaft of the armature of the dynamo, as shown in Fig. 1, and imparts thereby the required speed to the armature, so as to generate a current of sufficient intensity to bring the filament of the electric lamp to incandescence.

The surface of the friction-cone $D'$ may be slightly grooved or roughened, so as to produce the intimate frictional contact with the convex rim R of the wheel, and secure thereby the continuous rotation of the friction-cone, and, by the belt and pulleys, the uniform speed of rotation of the armature of the dynamo.

It is obvious that in place of the belt and pulleys for transmitting rotary motion from the shaft $d$ to the armature shaft, an intermediate shaft and bevel gears or any other motion-transmitting mechanism may be employed.

When the armature is to be rotated, so that electric currents are generated by the dynamo, the clamping-device $d^2$ $d^3$ of the friction-gear is moved up on the fork, so that the friction-cone $D'$ is placed in intimate contact with the rim R of the wheel. The tension of the transmitting belt $f$ is regulated by the slight adjustment of a screw $f^2$, on the strap $f^3$ by which the dynamo is attached to the frame A. When the dynamo is not to be operated, the clamping-device of the friction-gear is loosened and moved slightly in downward direction on the fork, sufficiently to interrupt the contact between the friction-cone and rim, whereby no motion is transmitted to the armature of the dynamo.

The driving-gear described can be readily applied to the frame of any bicycle, likewise the dynamo and the electric lamp, so that all the conditions for an electric-lighting outfit for bicycles are complied with in an effective manner.

The driving-gear is exceedingly simple and reliable in construction, and requires but a small supply of lubricating oil, owing to the tight fitting of the ball-retaining collars into the ends of the sleeve by which dust is excluded from the ball-bearings so that friction is reduced and an easy motion of the shaft of the friction-gear obtained.

Having thus described my invention, I claim as new and desire to secure by Letters Patent—

1. The combination, with the frame of a bicycle and the rim of one of the wheels of the same, of a frictional driving-gear consisting of a friction-cone placed in contact with the rim of the wheel, a shaft for said cone, a bracket-sleeve for said shaft, ball-bearings in the ends of said sleeve, and fixed collars on the shaft for retaining the anti-friction balls, substantially as set forth.

2. The combination, with the frame of a bicycle and the rim of one of the wheels of the same, of a frictional driving-gear, consisting of an elastic friction-cone placed in contact with the rim of said wheel, a shaft for said cone, a bracket-sleeve for supporting said shaft, a clamping-ring for applying the bracket-sleeve to the fork of the frame at one side of the rim of the wheel, and a clamping-screw for attaching or loosening the bracket-sleeve on said fork, substantially as set forth.

In testimony that I claim the foregoing as my invention I have signed my name in presence of two subscribing witnesses.

ERNEST TILMANN.

Witnesses:
PAUL GOEPEL,
GEO. L. WHEELOCK.